US009853333B2

United States Patent
Ramsayer

(10) Patent No.: US 9,853,333 B2
(45) Date of Patent: Dec. 26, 2017

(54) TEMPERATURE SENSOR AND METHOD FOR DETECTING A TEMPERATURE OF A BATTERY CELL

(71) Applicant: Robert Bosch GmbH, Stuttgart (DE)

(72) Inventor: Reiner Ramsayer, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 69 days.

(21) Appl. No.: 14/389,491

(22) PCT Filed: Feb. 13, 2013

(86) PCT No.: PCT/EP2013/052818
§ 371 (c)(1),
(2) Date: Sep. 30, 2014

(87) PCT Pub. No.: WO2013/143757
PCT Pub. Date: Oct. 3, 2013

(65) Prior Publication Data
US 2015/0064526 A1 Mar. 5, 2015

(30) Foreign Application Priority Data

Mar. 30, 2012 (DE) .................. 10 2012 205 303

(51) Int. Cl.
*H01M 10/48* (2006.01)
*G01K 7/08* (2006.01)
(Continued)

(52) U.S. Cl.
CPC ............ *H01M 10/486* (2013.01); *G01K 7/08* (2013.01); *G01K 13/00* (2013.01); *H01M 2/202* (2013.01);
(Continued)

(58) Field of Classification Search
None
See application file for complete search history.

(56) References Cited

U.S. PATENT DOCUMENTS 5,680,030 A * 10/1997 Kadouchi ............. B60L 3/0046
318/376
2007/0099074 A1 * 5/2007 Yoon ................... H01M 2/0277
429/158
(Continued)

FOREIGN PATENT DOCUMENTS

CN 201255627 Y 6/2009
DE 202007011399 9/2008
(Continued)

OTHER PUBLICATIONS

International Search Report for PCT/EP2013/052818, dated Jun. 5, 2013.

*Primary Examiner* — Ula C Ruddock
*Assistant Examiner* — Tony Chuo
(74) *Attorney, Agent, or Firm* — Norton Rose Fulbright US LLP

(57) ABSTRACT

A temperature sensor is described for detecting a temperature of a battery cell. The temperature sensor has a first electrical conductor having a first end for connecting the first conductor to an element of the battery cell and having a second end for connecting the first conductor to a first input of a measuring device and a second electrical conductor having a first end for connecting the second conductor to the element of the battery cell and having a second end for connecting the second conductor to a second input of the measuring device.

15 Claims, 4 Drawing Sheets

(51) Int. Cl.
  *H01M 2/20* (2006.01)
  *H01M 2/30* (2006.01)
  *G01K 13/00* (2006.01)
  *H01M 10/0525* (2010.01)

(52) U.S. Cl.
  CPC ......... *H01M 2/30* (2013.01); *H01M 10/0525* (2013.01); *G01K 2217/00* (2013.01)

(56) References Cited

U.S. PATENT DOCUMENTS

2008/0175304 A1* 7/2008 Adelsberg ................ G01K 7/04
   374/179
2014/0023897 A1* 1/2014 Suga ..................... H01M 10/48
   429/90

FOREIGN PATENT DOCUMENTS

| | | | |
|---|---|---|---|
| DE | 102010050997 | 5/2012 | |
| JP | S6319774 | 1/1988 | |
| JP | H01143160 | 6/1989 | |
| JP | 05-326024 | * 12/1993 | ............ H01M 10/44 |
| JP | H1092476 | 4/1998 | |
| WO | WO2009/126797 | 10/2009 | |
| WO | WO 2012/137289 A1 | * 10/2012 | ............ H01M 10/48 |

* cited by examiner

TEMPERATURE SENSOR AND METHOD FOR DETECTING A TEMPERATURE OF A BATTERY CELL

FIELD OF THE INVENTION

The present invention relates to a temperature sensor for detecting a temperature of a battery cell, to a battery cell as well as to a method for detecting a temperature of a battery cell.

BACKGROUND INFORMATION

The temperature monitoring of battery cells in a battery module or a battery pack is involved with an important variable for the service life and the optimal operation, and also for the safety monitoring of lithium-ion cells.

German Patent No. 20 2007 011 399 describes, for example, a battery monitoring system having a probe dipping into the battery acid of a battery cell, which has a temperature sensor.

SUMMARY

With this as background, the present invention provides a temperature sensor for detecting a temperature of a battery cell, a battery cell, as well as a method for detecting a temperature of a battery cell.

To monitor the temperature of a battery cell, one may use thermoelectric voltages at a contact point with the battery cell. In this context, the contact point may be an integral component of a temperature sensor as well as of the battery cell. In this way, the temperature of the battery cell is able to be detected directly and without delay. The temperature sensor may be a thermocouple or part of a thermocouple. The thermoelectric voltages at the contact point may additionally or alternatively be used for temperature monitoring for battery diagnosis.

By evaluating thermoelectric voltages at the contact point, the temperature is able to be detected rapidly and cost-effectively. The temperature of the battery cell may be used for cell monitoring and diagnosis. The necessary measuring lines are easy to apply without additional components, since the leads may be part of the temperature sensor itself and consequently, for instance, a part of a measuring probe itself. Using a temperature sensor according to the approach presented here, a simple and rapid application of the leads as well as a rapid of the temperature at the measuring location is possible, at slight time delay compared to thermocouples that are adhered on. Consequently, it is not necessary to measure temperatures directly at the battery cell via external temperature sensors having an inert response, and to supply it to an evaluation unit, for which it would be required to apply temperature sensors directly to the battery cell. A temperature sensor, such as will be described below in greater detail, advantageously demonstrates a very rapid response.

A temperature sensor for detecting a temperature of a battery cell has the following features:

a first electrical conductor having a first end for connecting the first conductor to an element of the battery cell and having a second end for attaching the first conductor to a first input of a measuring device; and a second electrical conductor having a first end for connecting the second conductor to the element of the battery cell, and having a second end for attaching the second conductor to a second input of the measuring device, the first conductor being connected via the element in an electrically conductive manner to the second conductor, and between the second end of the first conductor and the second end of the second conductor there being a voltage present that represents the temperature and is detectable by the measuring device, when the first end of the first conductor and the first end of the second conductor are connected to the element in an electrically conductive manner.

A battery cell may be an electrochemical energy store for storing electrical energy in chemical form. For instance, the battery cell may be a lithium-ion cell. A plurality of battery cells may be connected together to form one battery. In a corresponding way, the temperature sensor may also be used for detecting a temperature of a battery. Based on the internal resistance of the battery cell and/or the process heat of electrochemical processes in the battery cell, the battery cell may have a temperature that differs from the environmental temperature. An electrical conductor of the temperature sensor may be a metallic wire, for instance, or a circuit trace. The conductor is electrically conductive. If there exists a temperature gradient between two opposite ends of the electrical conductor, a thermoelectric voltage gradient develops in the conductor. The first conductor may be connected to an electrically conductive element of the battery cell. The element may be a component of the battery cell. Based on the integration of the element into the battery cell, the element is able to have the temperature or approximately the temperature prevailing on the inside of the battery cell. The second conductor may also be connected to the element, in order to form an open circuit through the conductor and the element. The circuit may be closed by the measuring device. The measuring device may be developed for carrying out a voltage measurement. Since the element and the first ends of the conductors connected to it are at a common voltage potential, at the opposite second ends of the conductors different voltage potentials may be tapped and evaluated by the measuring device. The voltage potentials able to be tapped are a function of the temperature gradient in the conductors. In this way, one may conclude on the temperature of the battery cell from the voltage potential tapped by the measuring device.

The first and the second conductor may also be designated as sensor lines. The first and the second conductor may lead directly to an electronic evaluation system, which is or may be placed close to the battery cell. The electronic evaluation system may be situated on a printed circuit board, a lead frame structure or a circuit substrate. This brings about line lengths of the two conductors in the range of several millimeters or from one to several centimeters. The line lengths may be implemented between 20 mm and 100 mm, for example. The values mentioned of the line lengths have, however, been selected in only exemplary fashion, and may also be shorter or longer. The line lengths particularly are greatly a function of constructive boundary conditions.

The temperature sensor may have the element of the battery cell. In this context, the first end of the first conductor and the first end of the second conductor may be connected to the element in an electrically conductive manner. The first ends of the conductors may be firmly connected to the element. The first ends may be joined to the element, for example, such as being welded on. A welding connection may be carried out without additional substances, such as by using a laser welding process. By doing without additional substances, the number of materials in the circuit may be reduced, and a reliable statement may be achieved on the temperature of the battery cell.

The element may be a first conductive material as well as a second conductive material that is different from the first. In this instance, the first end of the first conductor may be connected to the first material, and the first end of the second conductor may be connected to the second material. The materials may be connected to each other in a directly conducting manner. The materials may be situated in a heat flow, which is able to cause a thermoelectric voltage between the materials. The thermoelectric voltage may be tapped via the conductors. The thermoelectric voltage may be amplified in the conductors. Consequently, the tapping of a thermoelectric voltage takes place at a connection of different types. The conductors may advantageously be designed to be of the same types, that is, being made of the same material, for example.

The element may have a first electrically conductive material. The second conductor may have a second electrically conductive material that is different from the first material. The first end of the first conductor and the first end of the second conductor may be connected to the first material. The voltage potential may be the same at a connecting point of the first material and of the second material. The voltage gradient may be different in the first conductor and the second conductor. At the second ends of the conductors, different voltage potentials may be tapped. Consequently, the tapping of a thermoelectric voltage takes place at a connection of the same types via conductors of different types. This is advantageous if only one element of the battery cell made of a material is available for attaching the conductors.

The first electrically conductive material and the second electrically conductive material may have different Seebeck coefficients. For example, the different materials may be aluminum and copper. Thereby, using standard materials, a thermocouple is able to be produced directly from the element of the battery cell that is coupled thermally to the battery cell.

The element may be designed as an electric battery terminal of the battery cell. The battery terminal may be a pole of the battery cell. The battery terminal may be a metallic connection from an outer side of the battery cell to the inside of the battery cell. The battery terminal may have approximately the same temperature as the inside of the battery cell, The element may be designed as an electrically conductive housing of the battery cell. A housing of the battery cell may on the inner side be directly in contact with a storage medium of the battery cell. On an outside of the housing, while using the two conductors, a temperature may be detected which correlates directly with a temperature of the storage medium.

The second end of the first conductor and, alternatively or supplementarily, the second end of the second conductor may be decoupled thermally from the battery cell.

The second ends may be situated in such a way that they have a different temperature level than the battery cell. The second ends may be situated, for example, in a heat sink, in order to make possible a large temperature difference in the conductors.

The temperature sensor may have the measuring device for measuring the voltage. In this case, the first terminal of the measuring device may be connected electrically conductively to the second end of the first conductor, and the second input of the measuring device may be connected electrically conductively to the second end of the second conductor. One may take the term measuring device to mean a voltmeter, for instance. The measuring device may have a large internal resistance. The measuring device may be developed as an integrated circuit. The measuring device may be developed to provide a temperature-related signal, such as an electric voltage for an evaluation unit. The evaluation unit may be developed to determine a temperature value of the temperature of the battery cell, based on the temperature-related signal. Consequently, the measuring device may be regarded as a measuring unit in connection with the conductors.

A battery cell has the following features:

a galvanic element; and a temperature sensor according to the approach provided in this instance, the element being coupled thermally to the galvanic element.

A galvanic element may be an electrochemical cell of the battery cell. The battery cell may have a plurality of galvanic elements. The galvanic element may have on outer cover. The element of the battery cell which is connected to the conductors of the temperature sensor, may be a pole of the battery cell, for example, which penetrates the outer cover, or the element may be an electrically conductive part of an outer cover or of a housing of the battery cell.

A method for detecting a temperature of a battery cell has the following steps:

Tapping a temperature-dependent electric voltage between a first conductive material and a second conductive material that is different from the first material, the temperature being detected at an element of the battery cell, and the element having at least the first material; and Ascertaining the temperature while using the electric voltage.

By a temperature-dependent electric voltage one should understand a thermoelectric voltage based on the Seebeck effect. The voltage may represent a temperature at a contact point of the materials. The temperature may be ascertained while using working instruction. A working instruction may compensate for a nonlinear curve of a voltage characteristic curve of the temperature sensor, in order to receive a further processable signal

DETAILED DESCRIPTION

Figure 1:
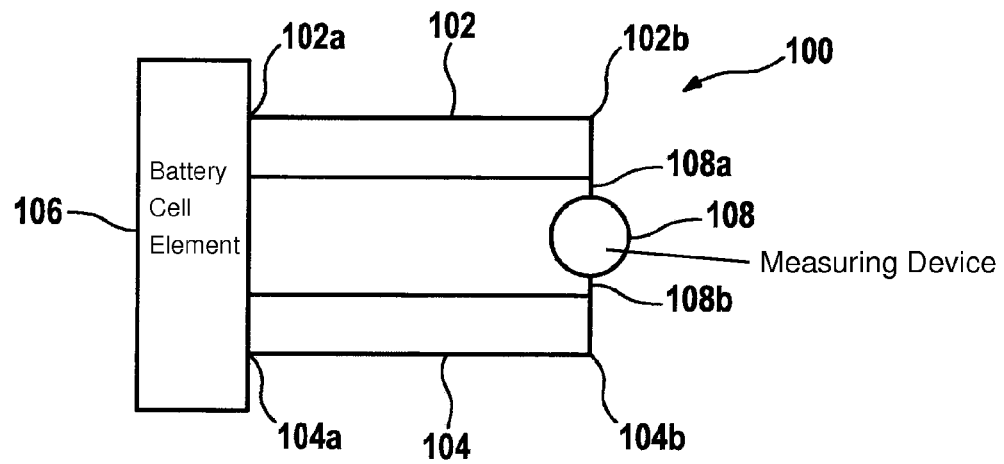
FIG. 1 shows a block diagram of a temperature sensor for recording a temperature of a battery cell, according to an exemplary embodiment of the present invention.

In the subsequent description of preferred exemplary embodiments of the present invention, the same or similar reference numerals are used for the elements that are shown in the various figures and act similarly, a repeated description of these elements having been dispensed with.

FIG. 1 shows a block diagram of a temperature sensor 100 for detecting a temperature of a battery cell, according to an exemplary embodiment of the present invention. The temperature sensor has a first electrical conductor 102 and a second electrical conductor 104. The first electrical conductor 102 has a first end 102a and an opposite second end 102b. The first end 102a of the first conductor 102 is provided for connecting first conductor 102 with an element 106 of the battery cell. The second end 102b of first conductor 102 is provided for connecting a first input 108a of a measuring device 108 to first conductor 102. The second electrical conductor 104 has a first end 104a and an opposite second end 104b. The first end 104a of the second conductor 104 is provided for connecting second conductor 104 with an element 106 of the battery cell. The second end 10b of second conductor 104 is provided for connecting a second input 108b of a measuring device 108 to second conductor 104.

When first end 102a of first conductor 102 and first end 104a of second conductor 104 are connected in a electrically conductive manner to element 106, first conductor 102 is connected in an electrically conductive manner to second conductor 104. Then there is a detectable voltage present between the second end 102b of first conductor 102 and the second end 104b of the second conductor that is detectable by measuring device 108, which represents the temperature of element 106.

Measuring device 108 is developed to record the voltage, and to output a voltage signal that corresponds to the voltage. The voltage signal is able to be evaluated by an evaluation device. The evaluation device is developed to assign a temperature value to the voltage recorded by the measuring device 108, which represents the temperature of the battery cell. In addition or alternatively, the evaluation device may be developed in order to provide a diagnostic signal based on the recorded voltage, for instance, the recorded voltage undershoots a threshold value, reaches it or exceeds it. The evaluation device may be part of measuring device 108 or be coupled to measuring device 108.

Figure 2:
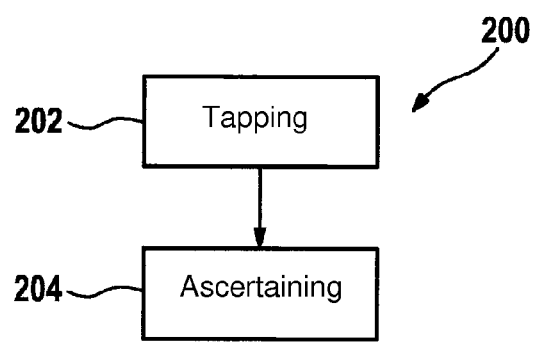
FIG. 2 shows a flow chart of a method for detecting a temperature of a battery cell, according to an exemplary embodiment of the present invention.

FIG. 2 shows a block diagram of a method (200) for detecting a temperature of a battery cell, according to one exemplary embodiment of the present invention. Method 200 has a step of tapping 202 and a step of ascertaining 204. In the step of tapping 202, a temperature-dependent electric voltage between a first conductive material and a second conductive material from the first material is tapped. The temperature is detected at an element of the battery cell which has the at least one first material. In the step of ascertaining 204, the temperature is ascertained while using the electric voltage, and, under certain circumstances, by using working instructions. The working instructions may include an association between the electric voltage values which, for instance, are detected by the measuring device described in FIG. 1 and provided, and assigned temperature values of the battery cell. Steps 202, 204 of the method may be carried out, for instance, with the aid of the temperature sensor described in FIG. 1.

Figure 3A:
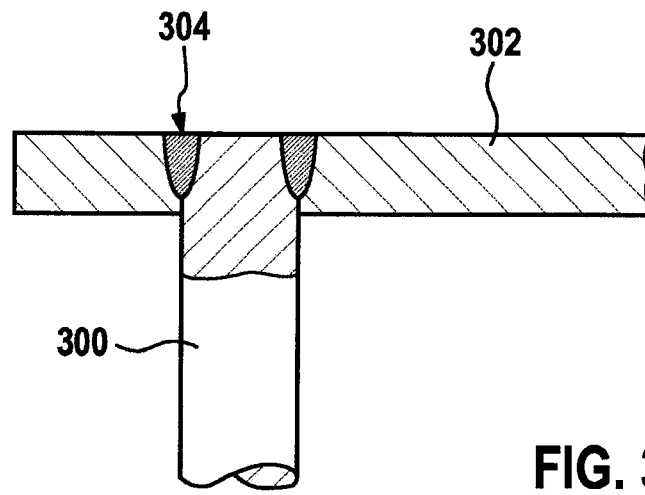
FIGS. 3a and 3b show representations of a battery terminal and a cell connector welded to it as a component of a temperature sensor according to an exemplary embodiment of the present invention.
Figure 3B:
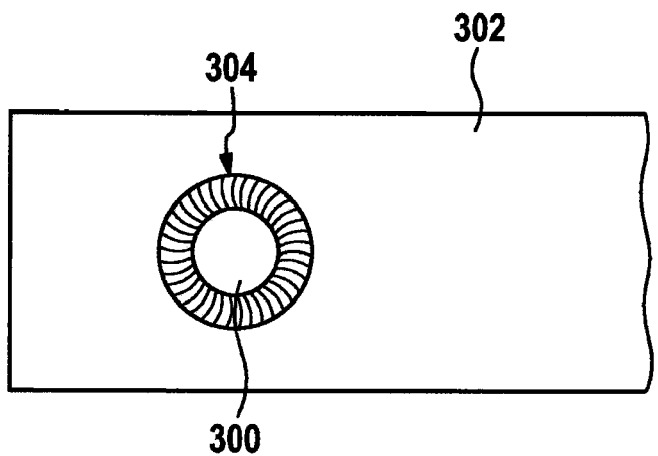

FIGS. 3a and 3b show representations of a battery terminal 300 and a cell connector welded to it as a component of a temperature sensor according to an exemplary embodiment of the present invention. In particular, what is shown is a contact point of cell connector 302 to battery terminal 300.

FIG. 3a shows a sectional representation through a common center plane of battery terminal 300 and cell connector 302.

Battery connector 300 is designed in a subsection shown here as a solid cylinder made of metal. Battery terminal 300 links in a galvanic element of a battery cell, not shown in FIG. 3a, in an electrically conductive manner. For this purpose, battery terminal 300 is provided to project from a housing of the battery cell. Battery terminal 300 is connected to cell connector 302, in order electrically to connect up the further battery cell, not shown here, with at least one further battery cell. Cell connector 302 is designed as a rectangular plate and, in a section shown, it has a transversely situated through hole which corresponds to battery terminal 300 in diameter. The battery terminal is situated in the through hole, and is connected in a continuous material by a welding seam 304 to cell connector 302. Because of welding seam 304, the two components are connected particularly well in an electrically conductive material. In the exemplary embodiment shown, the welding seam is designed as a laser welding seam 304 encircling the through hole.

Battery terminal 300 penetrates cell connector 302 and closes on the upper side of cell connector 302 in a planar manner with cell connector 302. Welding seam 304 is applied from the upper side into a joining location between battery terminal 300 and cell connector 302.

FIG. 3b shows a top view onto battery terminal 300 and cell connector 302, as they are described in FIG. 3a. According to this exemplary embodiment, at the cell terminal, battery terminal 300 is a cylindrical bolt made of aluminum or copper materials, is contacted to cell connector 302, according to this exemplary embodiment, made of aluminum or copper materials. This connection via a laser welding process or another same material joining method, is preferably produced or connecting bolt 300 is connected to cell connector 302 via a plug connection, for instance, for example, an ultrasound supported pressing in.

If a connection is produced of unequal types in which the battery terminal and the cell connector are made of different materials, for instance, of different metals, at joining connection 304, a thermoelectric voltage is created. For instance, battery terminal 300 may be produced of aluminum, and cell connector 302 of copper. In the case of aluminum copper, having Seebeck coefficients Al=3.5 µV/K and Cu=6.5 µV/K, a voltage of 3 µV/K temperature increase may be tapped off at this point, as will be described below with reference to FIG. 4.

Figure 4:
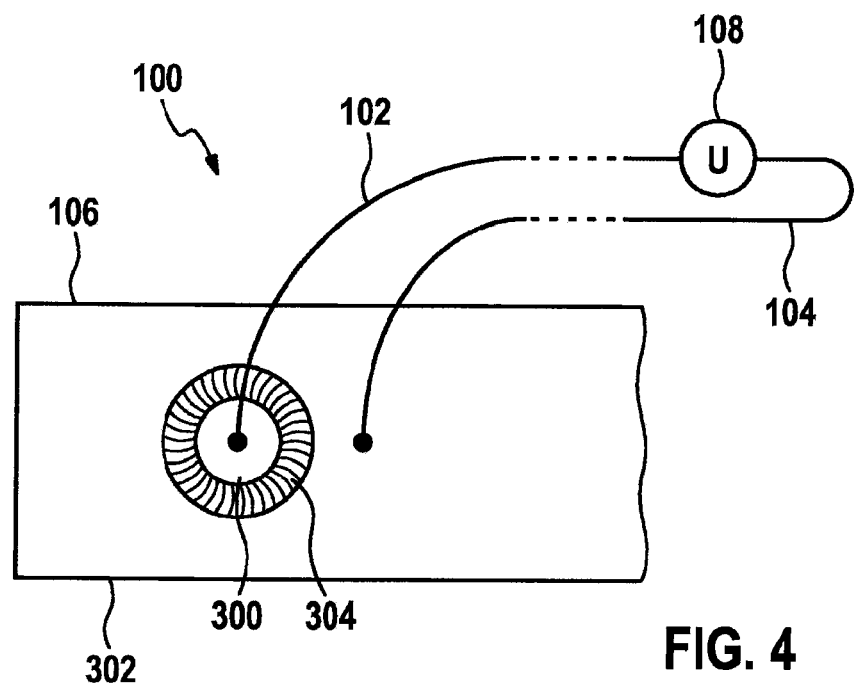
FIG. 4 shows a representation of a temperature sensor for detecting a temperature of a battery cell, according to an exemplary embodiment of the present invention.

FIG. 4 shows a representation of a temperature sensor 100 for detecting a temperature of a battery cell, according to an exemplary embodiment of the present invention. In particular, the tapping of a thermo voltage is shown at a connection of different types.

Temperature sensor 100 has a first conductor 102, a second conductor 104, an element 106 of a battery cell and a voltage measuring unit 108. First conductor 102 is connected to element 106 in an electrically conductive manner and to voltage measuring unit 108. Element 106 is connected in an electrically conductive manner to second conductor 104. Second conductor 104 is connected to voltage measuring unit 108 in an electrically conductive manner. Together, the components form a closed circuit. Conductors 102, 104 are wires in this exemplary embodiment. Conductors 102, 104 may be of the same type, i.e. made of the same material. Element 106 is an electrically conductive component of a battery cell and is designed as a battery terminal 300 and cell connector 302, as described in FIG. 3. Battery terminal 300 has a first conductive material having a first Seebeck coefficient. Battery terminal 302 has a first conductive material having a first Seebeck coefficient. The first material is different from the second material. Battery terminal 300 is connected to cell connector 302 by a laser welding seam 304 in a single material and an electrically conductive manner. First conductor 102 is connected to battery terminal 300; second conductor 104 is connected to cell connector 302. Battery terminal 300 conducts heat, which is created based on chemical processes and/or based on the internal resistance within the battery cell, outwards from the battery cell. Cell connector 302 conducts the heat away. This creates a heat flow through joining location 304 between the first material and the second material. Inside the first material there is formed a first heat-conditioned voltage gradient. Likewise, within the second material, there is formed a heat-conditioned second voltage potential. The voltage gradients are different and are characterized by the Seebeck coefficient of the respective material. At joining location 304, the first material and the second material necessarily have an identical voltage gradient, since the materials are connected to each other in a conductive manner. At those locations at which first conductor 102 and the second conductor are connected to element 106, there therefore exists in each case a different voltage potential. A difference in the voltage potentials is tapped by measuring device 108 via conductors 102 and 104 as thermoelectric voltage U.

In a further exemplary embodiment, in a connection of different types (for instance, Al and Cu), measuring lines 102, 104 are welded on. At a current flow through the connection, that is, the current flow over battery terminal 300 to cell connector 302, or vice versa, a temperature gradient sets in at connecting location 304. This temperature gradient is proportional to the flowing current (Peltier effect). This temperature gradient is able to be measured by measuring the thermoelectric voltage at contact location 304, so that one may also indirectly draw a conclusion on the current flow through joining location 304, and with that, through cell connector 302 or battery terminal 300.

Figure 5:
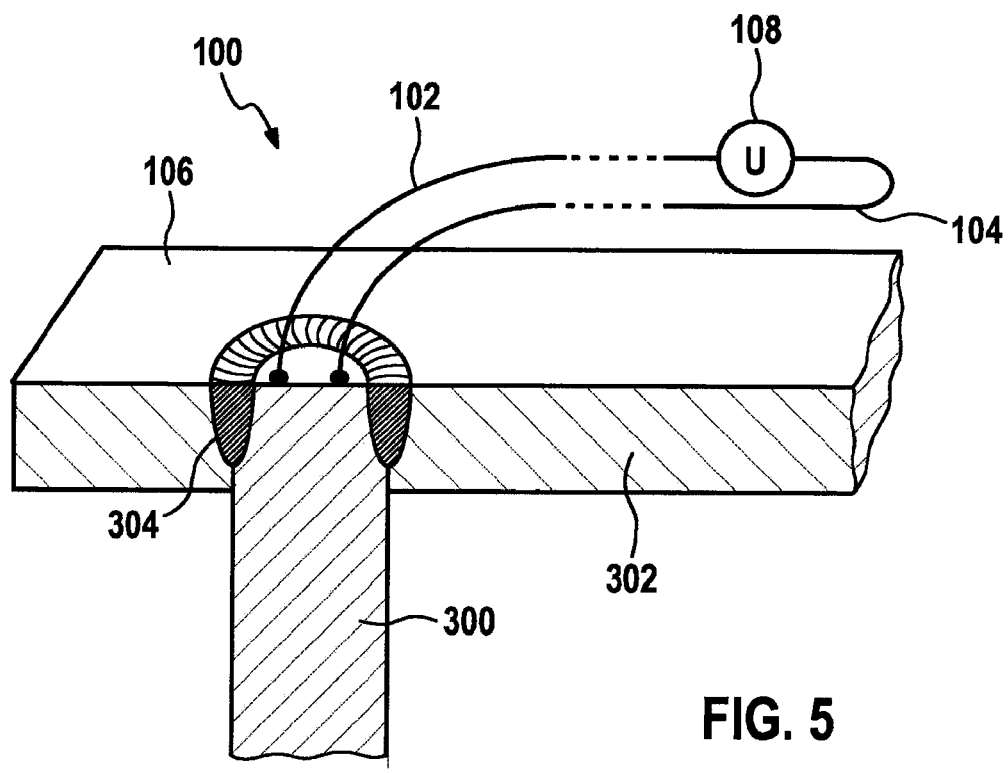
FIG. 5 shows a representation of a temperature sensor for detecting a temperature of a battery cell, according to an additional exemplary embodiment of the present invention.

FIG. 5 shows a representation of a temperature sensor 100 for detecting a temperature of a battery cell, according to a further exemplary embodiment of the present invention. What is shown in particular is the tapping of a thermoelectric voltage at a connection of the same type via supply wires not of the same type in the form of conductors 102, 104.

Corresponding to the description for FIG. 4, temperature sensor 100, according to this exemplary embodiment, has a first conductor 102, a second conductor 104, an element 106 of a battery cell and a voltage measuring unit 108. First conductor 102 is connected to element 106 in an electrically conductive manner and to voltage measuring unit 108. Element 106 is connected in an electrically conductive manner to second conductor 104. Second conductor 104 is connected to voltage measuring unit 108 in an electrically conductive manner. Together, the components form a closed circuit. In contrast to FIG. 4, first conductor 102 and second conductor 104 are connected to battery terminal 300. Battery terminal 300 has the first material, while second conductor 104 has the second material. Battery terminal 300 and cell connector 302 have the same material in this exemplary embodiment, which is why no thermoelectric voltage is able to be created in joining location 304. At this place, as described in FIG. 1, there exists a temperature gradient between battery terminal 300, at which the first ends of first and second conductor 102, 104 are fastened, and the second ends of first and second conductors 102, 104. In conductors 102, 104 there are different voltage gradients based on the different materials of conductors 102, 104. At the contact point between the first material and the second material, the voltage potentials are identical, whereby there is a thermoelectric voltage U present between the second ends of conductors 102, 104. Thermoelectric voltage U represents the temperature of battery connector 300, which is connected thermally to the battery cell.

If the connection is of the same type, as shown in FIG. 5, the supply line material may be embodied of different materials, so that the thermoelectric voltage sets in at the contact location. For this purpose, thermoelectric lines 102, 104 are positioned as tightly next to each other as possible and are preferable welded together using a laser welding point to battery terminal 300 or cell connector 302. In this case, the material of supply lines 102 and/or 104 may advantageously be selected so that a good continuous material connection comes about at the measuring location and also as advantageous as possible a thermoelectric voltage. The materials, in this case, are selected advantageously to have a great difference in the coefficient of the Seebeck effect, so that one may measure larger voltages.

Via the same method (same type of connection) the temperature at the housing may also be measured. For this purpose, line pairs 102, 104 are directly welded onto the housing or onto any other metallic point at which the temperature is to be measured.

Figure 6:
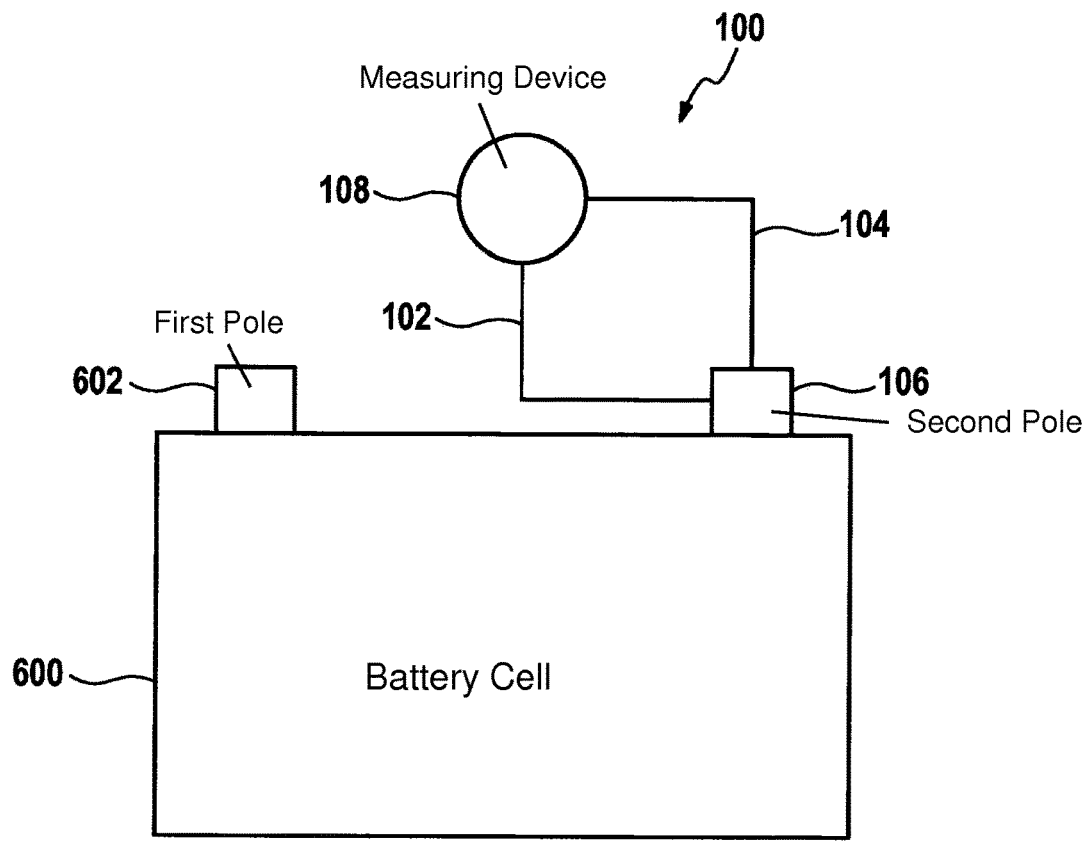
FIG. 6 shows a representation of a battery cell having a temperature sensor according to an exemplary embodiment of the present invention.

FIG. 6 shows a representation of a battery cell 600 having a temperature sensor 100 according to an exemplary embodiment of the present invention. Battery cell 600 has a first pole 602 and a second pole 106. Second pole 106 is a component of temperature sensor 100 which, as described for FIG. 1, has a first conductor 102, a second conductor 104, an element 106 of battery cell 600 and a measuring device 108. First pole 602 and second pole 106 are coupled electrically and thermally with battery cell 600. At second pole 106, as described in connection with FIG. 5, there is a transition location from a first material having a first Seebeck coefficient to a second material having a second Seebeck coefficient. The transition location may also be situated at a conductive housing of battery cell 600 that is thermally coupled to battery cell 600.

The exemplary embodiments described and shown in the figures have been selected merely as examples. Different exemplary embodiments are combinable with one another, either completely or with regard to individual features. An exemplary embodiment may also be supplemented by features from another exemplary embodiment. Furthermore, method steps according to the present invention may be carried out repeatedly and also performed in a sequence other than the one described. If an exemplary embodiment includes an "and/or" linkage between a first feature and a second feature, this may be understood to mean that the exemplary embodiment according to one specific embodiment has both the first feature and the second feature, and according to an additional specific embodiment, either has only the first feature or only the second feature.

What is claimed is:

1. A temperature sensor for detecting a temperature of a battery cell, comprising:
   a first electrical conductor having a first end for connecting the first conductor to an element of the battery cell, and having a second end for attaching the first conductor to a first input of a measuring device; and
   a second electrical conductor having a first end for connecting the second conductor to the element of the battery cell, and having a second end for attaching the second conductor to a second input of the measuring device;

wherein the first conductor is connected via the element in an electrically conductive manner to the second conductor,
wherein a voltage is present between the second end of the first conductor and the second end of the second conductor,
wherein the voltage represents the temperature and is detectable by the measuring device when the first end of the first conductor and the first end of the second conductor are connected to the element in an electrically conductive manner, and
wherein the element of the battery cell includes a battery terminal and a cell connector, wherein the battery terminal includes a first electrically conductive material and the cell connector includes a second electrically conductive material that is different from the first electrically conductive material, wherein the first end of the first conductor is connectable to the battery terminal, and wherein the first end of the second conductor is connectable to the cell connector, and
wherein the temperature is determined by determining a heat-conditioned voltage gradient between the battery terminal and the cell connector.

2. The temperature sensor as recited in claim 1, wherein the temperature sensor has the element of the battery cell, and wherein the first end of the first conductor and the first end of the second conductor are connected to the element in an electrically conductive manner.

3. The temperature sensor as recited in claim 2, wherein:
the element has a first electrically conductive material,
the second conductor has a second electrically conductive material that is different from the first electrically conductive material, and
the first end of the first conductor and the first end of the second conductor are connected to the first electrically conductive material.

4. The temperature sensor as recited in claim 2, wherein the first electrically conductive material and the second electrically conductive material have different Seebeck coefficients.

5. The temperature sensor as recited in claim 1, wherein the element includes one of an electrical battery terminal of the battery cell and an electrically conductive housing of the battery cell.

6. The temperature sensor as recited in claim 1, wherein at least one of the second end of the first conductor and the second end of the second conductor are thermally decoupled from the battery cell.

7. The temperature sensor as recited in claim 1, wherein:
the temperature sensor includes the measuring device,
a first terminal of the measuring device is connected electrically conductively to the second end of the first conductor, and
the second input of the measuring device is connected electrically conductively to the second end of the second conductor.

8. The temperature sensor as recited in claim 1, wherein the first conductor and the second conductor are made of the same material.

9. The temperature sensor as recited in claim 1, wherein the battery terminal is made of metal and projects from a housing of the battery cell and is connected to the cell connector, the cell connector having a plate configuration which has a through hole transversely situated in the plate.

10. The temperature sensor as recited in claim 9, wherein the battery terminal is situated in the through hole, and is connected in a continuous material by a welding seam to the cell connector.

11. The temperature sensor as recited in claim 1, wherein the battery terminal is made of metal and projects from a housing of the battery cell and is connected to the cell connector, the cell connector having a plate configuration which has a through hole transversely situated in the plate, wherein the battery terminal is situated in the through hole, and is connected in a continuous material by a welding seam to the cell connector, wherein the welding seam encircles the through hole, wherein the battery terminal penetrates the cell connector and closes on an upper side of the cell connector in a planar manner with the cell connector, and wherein the welding seam is applied from the upper side into a joining location between the battery terminal and the cell connector.

12. A battery cell, comprising:
a galvanic element; and
a temperature sensor including:
a first electrical conductor having a first end for connecting the first conductor to an element of the battery cell, and having a second end for attaching the first conductor to a first input of a measuring device, and
a second electrical conductor having a first end for connecting the second conductor to the element of the battery cell, and having a second end for attaching the second conductor to a second input of the measuring device, wherein:
the first conductor is connected via the element in an electrically conductive manner to the second conductor,
a voltage is present between the second end of the first conductor and the second end of the second conductor,
the voltage represents the temperature and is detectable by the measuring device when the first end of the first conductor and the first end of the second conductor are connected to the element in an electrically conductive manner, and
the element is thermally coupled to the galvanic element;
wherein the element of the battery cell includes a battery terminal and a cell connector, wherein the battery terminal includes a first electrically conductive material and the cell connector includes a second electrically conductive material that is different from the first electrically conductive material, wherein the first end of the first conductor is connectable to the battery terminal, and wherein the first end of the second conductor is connectable to the cell connector, and
wherein the temperature is determined by determining a heat-conditioned voltage gradient between the battery terminal and the cell connector.

13. The battery cell as recited in claim 12, wherein the battery terminal is made of metal and projects from a housing of the battery cell and is connected to the cell connector, the cell connector having a plate configuration which has a through hole transversely situated in the plate.

14. The battery cell as recited in claim 13, wherein the battery terminal is situated in the through hole, and is connected in a continuous material by a welding seam to the cell connector.

15. The battery cell as recited in claim 12, wherein the battery terminal is made of metal and projects from a housing of the battery cell and is connected to the cell connector, the cell connector having a plate configuration which has a through hole transversely situated in the plate, wherein the battery terminal is situated in the through hole, and is connected in a continuous material by a welding seam to the cell connector, wherein the welding seam encircles the through hole, wherein the battery terminal penetrates the cell connector and closes on an upper side of the cell connector in a planar manner with the cell connector, and wherein the welding seam is applied from the upper side into a joining location between the battery terminal and the cell connector.

* * * * *